United States Patent
Karl et al.

(10) Patent No.: US 7,689,017 B2
(45) Date of Patent: Mar. 30, 2010

(54) MEDICAL IMAGE PROCESSING

(75) Inventors: William C. Karl, Andover, MA (US); Zhuangli Liang, Brighton, MA (US); Homer Pien, Andover, MA (US); Thomas J. Brady, Winchester, MA (US)

(73) Assignee: The General Hospital Corporation, Boston, MA (US)

( * ) Notice: Subject to any disclaimer, the term of this patent is extended or adjusted under 35 U.S.C. 154(b) by 954 days.

(21) Appl. No.: 11/424,923

(22) Filed: Jun. 19, 2006

(65) Prior Publication Data
US 2007/0147696 A1    Jun. 28, 2007

Related U.S. Application Data

(63) Continuation-in-part of application No. 11/320,153, filed on Dec. 28, 2005.

(51) Int. Cl.
*G06K 9/00* (2006.01)
*A61B 6/00* (2006.01)
*A61B 5/05* (2006.01)

(52) U.S. Cl. .......................... 382/128; 378/4; 600/425

(58) Field of Classification Search .............. 382/128, 382/129, 130, 131, 132, 133, 134, 254; 378/8, 378/97, 108, 4, 21, 23, 24, 25, 26, 27, 28, 378/90, 92, 10, 901; 128/920, 922; 600/407, 600/425, 458; 424/9.3
See application file for complete search history.

(56) References Cited

U.S. PATENT DOCUMENTS 6,252,931 B1 *  6/2001  Aach et al. ................. 378/98.2
6,591,004 B1 *  7/2003  VanEssen et al. ........... 382/154
6,907,102 B1 *  6/2005  Sauer et al. .................. 378/19
7,187,794 B2 *  3/2007  Liang et al. ................. 382/131
2002/0070970 A1  6/2002  Wood et al.
2003/0091142 A1  5/2003  Li
2006/0098010 A1  5/2006  Dwyer et al.

FOREIGN PATENT DOCUMENTS

EP         0434872        7/1991

OTHER PUBLICATIONS

Notification of transmittal of the International Search Report and the Written Opinion of the International Searching Authority, or the Declaration. (Form PCT/ISA/220), 2 pages, Apr. 24, 2007.

(Continued)

*Primary Examiner*—Abolfazl Tabatabai
(74) *Attorney, Agent, or Firm*—Quarles & Brady LLP (57) ABSTRACT

In one aspect, the invention is a method to reduce a blooming effect of a bright object in a medical image generated from a low-dose imaging system. The method includes characterizing an ideal image as a composition of a first component and a second component. The first component is characterized by a first function and the second component is characterized by a second function. The method also includes minimizing the first function and the second function using a smoothing process and generating the medical image based on the minimizing.

18 Claims, 3 Drawing Sheets

OTHER PUBLICATIONS

International Search Report. (Form PCT/ISA/210), 4 pages.
Written Opinion of the International Searching Authority. (Form PCT/ISA/237), 5 pages.
Liang et al., "Image Enhancement in Detection of Coronary Stenosis Using MDCT", Poster Posted at National Science Foundation Visit 2005 at Northeastern University, Boston, MA, Apr. 7-8, 2005, 1 page.
Saleh et al., "Center for Subsurface Sensing & Imaging Systems", Research Overview Presentation at National Science Visit 2006 at Northeastern University, Boston, MA, Apr. 4-6, 2006, 52 pages.
Liang et al., "Image Enhancement in Detection of Coronary Stenosis Using MDCT", Poster Posted at National Science Foundation Visit 2006 at Northeastern University, Boston, MA, Apr. 4-6, 2006, 1 page.
Karl, "Fusing Multi-Modality Inverse Data Through Shared Boundary Structure", presented at National Science Foundation Visit 2006 at Northeastern University, Boston, MA, Apr. 6, 2006, 14 pages.
American Heart Association. Heart Disease and Stroke Statistics—2003 Update, Dallas, TX: American Heart Association, 2003, 46 pages.
Chandrasekar et al., "Complications of Cardiac Catheterization in the Current Era: A single-Center Experience" Catheter Cardiovas. Interv. 2001;52:289-95.
Thompson et al., "Imaging of Coronary Calcification by Computed Tomography" J. Magn. Reson. Imaging. 2004; 19:720-33.
Barrett et al., "Artifacts in CT: Recognition and Avoidance", Radiographics 2004;24:1679-91.
DeMan et al., "Metal Streak Artifacts in X-Ray Computed Tomography: A Simulation Study", IEEE Trans. Nuclear Sci. 1999;46:691-696.
Nakanishi et al., "Pitfalls in 16-Detector row CT of the Coronary Arteries", Radiographics 2005;25:425-38.
Glover, et al., "An Algorithm for the Reduction of Clip Artifacts in CT Reconstructions", Med. Phys. 1981;8:799-807.
Kalender et al., "Reduction of CT Artifacts Caused by Metallic Implants", Radiology 1987;164:576-7.
Kacheiriess, et al., "Generalized Multi-Dimensional Adaptive Filtering for Conventional and Spiral Single-Slice, Multi-Slice, and Cone-Bean CT", Med. Phys. 2001:28:475-90.
Watzke O. Kalender WA. A Pragmatic Approach to Metal Artifact Reduction in CT: Merging of Metal Artifact Reduced Images, Eur. Radiol. 2004:14:849-56.
Wang et al., "Iterative Deblurring for CT Metal Artifact Reduction", IEEE Transactions on Medical Imaging 1996;15:657-664.
Wang et al., "Local Computed Tomography via Iterative Deblurring", Scanning 1996;18:582-8.
Robertson et al., "Total Hip Prosthesis Metal-Artifact Suppression Using Iterative Deblurring Reconstruction", J. Comput. Assist. Tomogr. 1997;21:293-8.
Williamson et al., "Prospects for Quantitative Computed Tomography Imaging in the Presence of Foreign Metal Bodies Using Statistical Image Reconstruction", Med. Phys. 2002;29:2404-18.
Wang et al., "Fast Iterative Algorithm for Metal Artifact Reduction in X-ray CT", Acad. Radiol. 2000;7:607-14.
Wang et al., "Iterative X-Ray Cone-Beam Tomography for Metal Artifact Reduction and Local Region Reconstruction", Microscopy and Microanalysis 1999;5:58-65.
Nuyts et al., "Iterative Reconstruction for Helical CT: A Simulation Study", Phys. Med. Biol. 1998;43:729-37.
De Man et al., "An Iterative Maximum-Likelihood Polychromatic Algorithm for CT", IEEE Trans. Med. Imaging 2001;20:999-1008.
Sakai et al., "The Use of Deblurring Technique for Improving the Longitudinal Resolution in Helical CT of the Head and Neck Region", Comput. Med. Imaging Graph 1997;21:153-64.
Jiang et al. "Blind Deblurring of Spiral CT Images-Comparative Studies on Edge-To-Noise Ratios", Med. Phys. 2002;29:821-9.
Jiang et al., "Blind Deblurring of Spiral CT Images", IEEE Trans. Med. Imaging 2003;22:837-45.
Wang et al., "Spiral CT Image Deblurring for Cochlear Implantation", IEEE Trans. Med. Imaging 1998;17:251-62.
Rollano-Hijarrubia et al., "Improving the Imaging of Calcifications in CT by Histogram-Based Selective Deblurring", Proceedings of the SPIE Conference on Medical Imaging 2005,12 pages.
Osher et al., "Image Decomposition and Restoration using Total Variation Minimization and the H-1 Norm", Multiscale Model. Simul. 2003;1:349-370.
Vese et al., "Modeling Textures with Total Variation Minimization and Oscillating Patterns in Image Processing", Journal of Scientific Computing 2003:19.
Bertalmio et al., "Simultaneous Structure and Texture Image Inpainting", IEEE Trans. Image Proc. 2003;12:882-889.
Vese, "Image Denoising and Decomposition with Total Variation Minimization and Oscillatory Functions", Journal of Mathematical Imaging and Vision 2004;20:7-18.
Donoho et al., "Maximum Entropy and the Nearly Black Object", J.R. Statist. Soc. 1992; B54:41-81.
Donoho, David L., "Superresolution via Sparsity Constraints", SIAM J. Math. Anal. 1993;23:1309-1331.
Gauch, et al., "Hybrid Boundary-Based and Region-Based Deformable Models for Biomedical Image Segmentation", SPIE Mathematical Methods in Medical Imaging III 1994;2299:72-83.
Gauch, et al., "Hybrid Deformable Models for Three-Dimensional Biomedical Image Segmentation", IEEE Proc. Nuclear Science and Medical Imaging 1994;4:1935-1939.
Pien, et al., "Variational Segmentation of Multi-Channel MRI Images", IEEE Int'l Conf. Image Processing 1994;3-508-512.
Pien, et al. "A Variational Approach to Multi-Sensor Fusion of Images", Int'l J. Applied Intelligence 1995;5:217-235.
Tari, et al., "A Computationally Efficient Shape Analysis Via Level Sets", IEEE Mathematical Methods in Biomedical Image Analysis 1996:234-243.
Shah, et al., "Recovery of Surfaces with Discontinuities by Fusing Shading and Range Data Within a Variational Framework", IEEE Trans. Image Processing 1996;5:1243-1251.
Tari, et al., "Extraction of Shape Skeletons from Grayscale Images", Computer Vision and Image Understanding 1997;66:133-146.
Pien, et al., "Segmentation of MR Images Using Curve Evolution and Prior Information", Int'l Journal of Pattern Recognition and Artificial Intelligence 1997;11:1233-1245.
Bhatia, et al., "A Wavelet-Based Method for Multiscale Tomographic Reconstruction", IEEE Transactions on Medical Imaging 1996;15:92-101.
Fosgate, et al., "Multiscale Segmentation and Anomaly Enhancement of SAR Imagery", IEEE Transactions on Image Processing Special issue on Automatic Target Recognition 1997;6:7-20.
Bhatia, et al., "Tomographic Reconstruction and Estimation Based on Multiscale Natural-Pixel Bases", IEEE Transactions on Image Processing special issue on Automatic Target Recognition 1997;6:463-478.
Kaufhold, et al., "A Statistical Method for Efficient Segmentation of MR Imagery", Int'l Journal of Pattern Recognition and Artificial Intelligence Special issue on Processing of MRI Imagery 1997;11:1213-1231.
Kaufhold, et al., "A Texture-Based Variational Segmentation Method for Ultrasound Blood Vessel Imagery", Abstract, Annals of Biomedical Engineering 1998;26.
Schneider, et al., "Multiscale Methods for the Segmentation and Reconstruction of Signals and Images", IEEE Transactions on Image Processing special issue on Automatic Target Recognition 2000;9:456-468.
Chan, et al., "A New Model-Based Technique for Enhanced Small-Vessel Measurements in X-Ray Cine-Angiograms", IEEE Transactions on Medical Imaging 2000;19:243-255.
Feng, et al., "A Curve Evolution Approach to Object-Based Tomographic Reconstruction", IEEE Transactions on Image Processing special issue on Automatic Target Recognition 2003;12:44-57.49.
Desai et al., "Functional MRI Activity Characterization Using Response Time Shift Estimates from Curve Evolution", IEEE Transactions on Image Processing, 2002;21:1402-1412.
Galdi, et al., "Moderately Rough Surface Underground Imaging via Short-Pulse Quasi-Ray Gaussian Beams", IEEE Transactions on Antennas and Propagation 2003;51:2304-2318.
Cetin, et al., "Feature Enhancement and ATR Performance Using Nonquadratic Optimization-Based SAR Imaging", IEEE Trans Aerospace and Electronic Systems 2003;39:1375-1395.

Weisenseel, et al., "A Variational Approach to Multi-Modality Subsurface Data Inversion and Fusion Based on Shared Image Structure", Subsurface Sensing Technologies and Applications 2003;4:375-394.

Karl, et al., "Capabilities and Limitations of Pupil-Plane Filters for Superresolution and Image Enhancement", Opt. Express 2004;12:4150-4156.

Chan, et al., "OCT-Based Arterial Elastography: Robust Estimation Exploiting Tissue Biomechanics", Optics Express 2004;12:4558-4572.

Perkins et al., "DE Report UCRL-1D117796, ENDL Type Formats for the LLNL;Evaluated Atomic Data Library (EADL), Evaluated Electron Data Library EEDL, and Evaluated Photon Data Library (EPDL)", Univ. of California, 32 Pages.

Cetin, et al., "Feature-Enhanced Synthetic Aperture Radar Image Formation Based on Nonquadratic Regularization", IEEE Transactions on Image Processing special issue on Automatic Target Recognition 2001;10:623-631.

Cetin, et al., "Superresolution and Edge-Preserving Reconstruction of Complex-Valued Synthetic Aperture Radar Images", IEEE Int'l Conf. on Image Processing, Vancouver, British Columbia, Canada, 2000:701-704.

* cited by examiner

MEDICAL IMAGE PROCESSING

CROSS REFERENCE TO RELATED APPLICATIONS

This application is a continuation-in-part of U.S. patent application Ser. No. 11/320,153, filed on Dec. 28, 2005, and entitled, "Medical Image Processing," which is incorporated herein by reference in its entirety.

TECHNICAL FIELD

This invention relates generally to image processing and more specifically to medical images.

BACKGROUND

There are a number of systems used for generating medical images. For example, a computed tomography (CT) system generates three-dimensional (3-D) images by generating a series of two-dimensional (2-D) X-ray images about an axis of rotation. In another example, a positron emission tomography (PET) system measures positron emissions from human tissue as a result of absorption of a radioactive molecule injected in to a human body. Other medical imaging systems include a magnetic resonance imaging system (MRI) which generates images by applying magnetic fields and radio frequency (RF) energy to the human body and recording the resultant effects on the nuclei in the human tissue.

SUMMARY

In one aspect, the invention is a method of medical image processing. The method includes characterizing an ideal image as a composition of a first component and a second component. The first component is characterized by a first function and the second component is characterized by a second function. The method also includes minimizing the first function and the second function using a smoothing process and generating the medical image based on the minimizing.

In another aspect, the invention is an apparatus, which includes a memory that stores executable instructions to reduce a blooming effect of a bright object in a medical image generated from a low-dose imaging system. The apparatus also includes a processor that executes the instructions to characterize an ideal image as a composition of a first component and a second component. The first component is characterized by a first function and the second component is characterized by a second function. The processor also executes instructions to minimize the first function and the second function using a smoothing process and to generate the medical image based on the instructions to minimize.

In a further aspect, the invention is an article, which includes a machine-readable medium that stores executable instructions to reduce a blooming effect of a bright object in a medical image generated from a low-dose imaging system. The instructions cause a machine to characterize an ideal image as a composition of a first component and a second component. The first component is characterized by a first function and the second component being characterized by a second function. The instructions also cause a machine to minimize the first function and the second using a smoothing process; and to generate the medical image based on the instructions causing a machine to minimize.

DETAILED DESCRIPTION

A key problem in medical imaging is the removal of artifacts which degrade the quality of the image for diagnostic purposes. To address this problem, described herein is a model-based approach to image processing wherein the structures or areas of interest in the image are explicitly partitioned according to their behavior and different constraints are imposed separately on each structure or area. This approach can be employed as either a post-processing (restoration) method or as an image formation (reconstruction) method. This approach differs considerably from conventional deblurring and filtered back projection reconstruction techniques. To partition the image structures significant features of the different structures are used. These are flexible, but could include characteristics such as smoothness, concentration of energy or brightness, intensity, etc. A single functional or energy is then defined which combines all these model elements. The minimum of this combined energy is then sought to produce a resulting image.

While the system and techniques described herein uses an embodiment that includes computed tomography (CT), the system and techniques are not limited to CT. For example the system and techniques may be used in any image processing or acquisition system such as a magnetic resonance imaging (MRI) system, a positron emission tomography (PET) system, ultrasound and so forth. While the system and techniques described herein are used for image processing to detect calcium in an artery, the system may be used in any image processing system such as to minimize blurring or blooming effects between any different materials. The method described herein uses two components to distinguish between materials, but the method may be used with any number of components.

Figure 1:
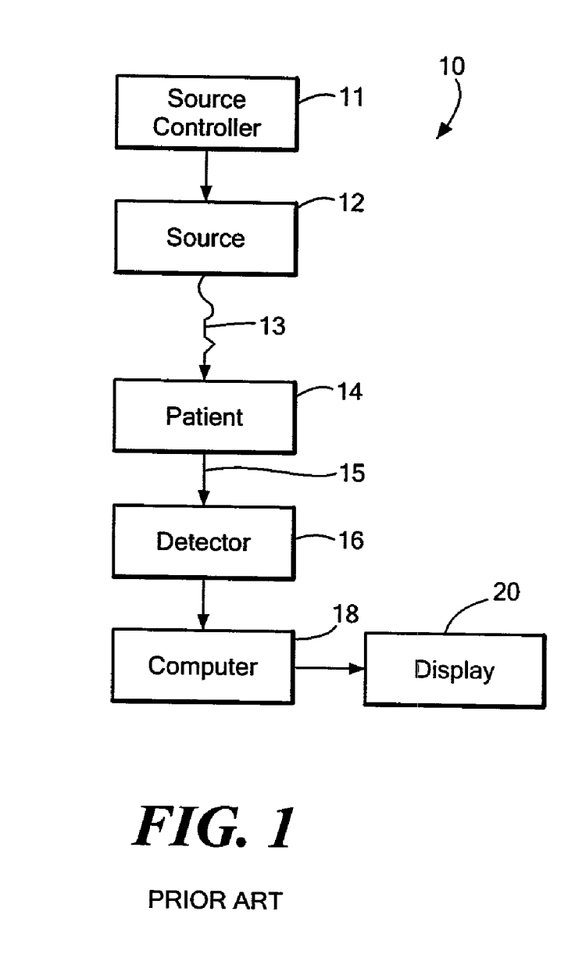
FIG. 1 is a diagrammatic view of a computed tomography (CT) system.

Referring to FIG. 1, a computed tomography system 10 includes an x-ray source 12, a patient 14, a detector 16, a computer 18 and a display 20. The X-ray source 12 emits an x-ray beam 13 which impinges upon or illuminates a portion (sometimes referred to as a slice) of patient 14. Portions of the x-ray beam are absorbed by structures within the patient (both physiological and non-physiological structures) and a portion of the beam 15 reached a detector 16. Detector 16 measures the absorption along numerous paths with both radial and tangential components. The computer 18 uses the measured absorption information collected by the detector 16 to form a cross-sectional image, which may be viewed on display 20.

Figure 2A:
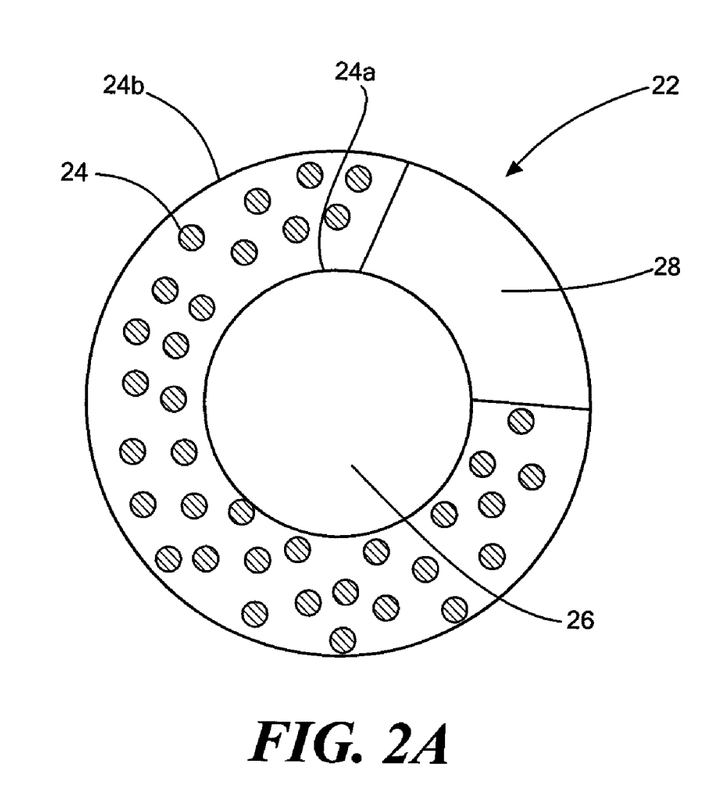
FIG. 2A is a diagrammatic view of an artery having calcification.
Figure 2B:
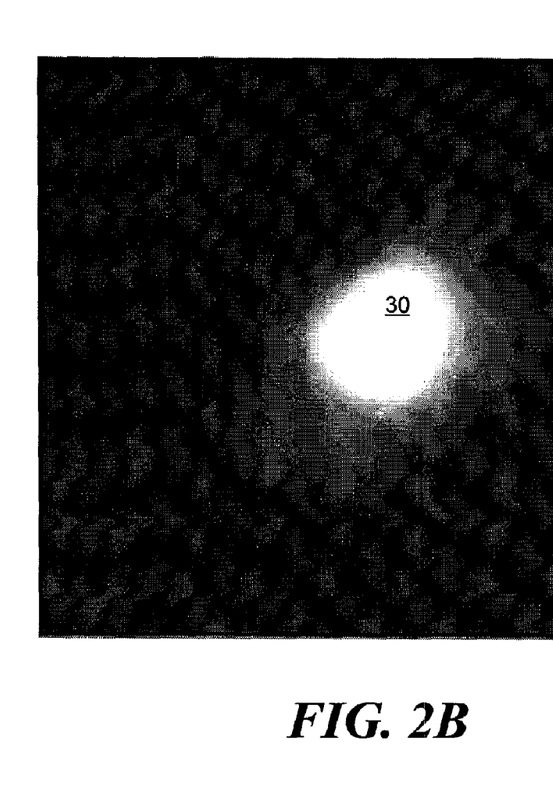
FIG. 2B is a CT image of the artery.

Referring to FIGS. 2A and 2B, an artery 22 includes a wall 24 having an inner wall portion 24a and an outer wall portion 24b. Inner wall portion 24a defines, a lumen 26. A portion of wall 24 may include a calcified region 28. Referring briefly to FIG. 2B, a CT image 30 of an artery similar to artery 22 (FIG. 2A) is shown. CT image 30 is provided using known image processing techniques. Despite the well-localized nature of the calcium region 28, the resulting image 30 shows nearly total obscuration of the luminal region 26, rendering the image 30 non-evaluable. A calcium artifact in coronary CT arises when the intensity of small dense calcium regions in the vessel wall spills into adjacent pixels due to the blurring induced by the resolution-limited image formation process. The CT system 10 together with the reconstruction process spreads the intensity of such calcified regions over the image, resulting in an over-representation of the size of the calcification ("calcium blooming") and often an under-representation of the size of the lumen 26. In this sense, the "blooming" effect is intrinsic to any imaging modality in which the point-spread function is of a scale comparable to the size of the objects that are of interest, and the field of view may contain bright objects which, due to the point-spread function, obscures nearby lower-intensity objects of interest.

Figure 3:
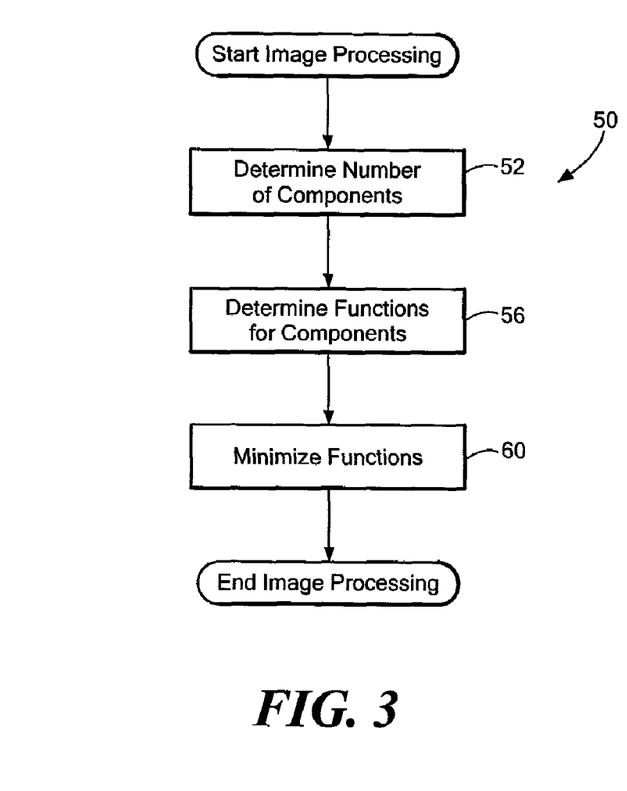
FIG. 3 is a flowchart for a process of processing an image.

Turning now, to FIG. 3, an image processing technique (e.g., a process 50) which may be performed, for example, by computer 18. The image processing described in FIG. 3 may be performed at post-processing, for example, after filtered back projection processing or with no image pre-processing.

Process 50 assumes an underlying desired ideal image f exists and that f is composed of multiple components as determined by the user or operator. Process 50 determines the number of components (52). The number of such components depends on factors including the complexity of the anatomy or object to be imaged, the degree to which a priori models exist for each component, and the resulting computational complexity. In the case of imaging an artery having a calcified portion, for example, one simple scenario is to model the ideal image f as the sum of two components: a calcium component $f_c$, and a non-calcified structured components, $f_s$, so that $$f = f_c + f_s.$$

Process 50 determines functions for each of the components identified in processing block 56. For example, $f_s$ is assumed to have a behavior having a lower amplitude and greater spatial extent than $f_c$.

Corresponding to the ideal image f is a set of observed data g. The observed data g may be an image formed using standard techniques (e.g., back filter projection), which exhibit calcium blooming or the data could be raw data, which corresponds to a set of tomographic projections obtained prior to image formation.

H denotes an image blurring operator that maps the ideal image f to a set of observed data g. Thus, in an example using an image formed using standard techniques, H represents convolutional blurring with the point spread function corresponding to the imaging process. In some embodiments, a filtered back projection generated image may be approximated as being shift invariant and convolutional. In another example, using raw data, H represents the tomographic projection process. The operator H may be linear, though this is not essential. An enhanced estimate of the ideal image by minimization of an energy function may be represented as:

$$\hat{f} = \arg\min_{f} E_d(g, f) + \alpha_s E_s(f_s) + \alpha_c E_c(f_c)$$

where E denotes the "component energy", d denotes the data term, and $\alpha_s$ and $\alpha_c$ are positive weights balancing the contributions of the different terms. The three terms capture the imaging process and the behavior of the underlying image. The term $E_d(f, g)$, represents the data generation process H and ensures fidelity to the observations. A common choice in the image processing literature is to set this term to the negative log likelihood of data. If the observations are assumed conditionally Gaussian, then:

$$E_d(f, g) = \|g - Hf\|_2^2$$

In other examples, a Poisson observation model may be used.

The term $E_s(f, g)$ represents the behavior of the non-calcified tissue image. Since it is assumed that the non-calcium image is somewhat smooth, then:

$$E_s(f_s) = \|Df_s\|_2^2$$

where D is a discrete approximation to a derivative operator. Since the non-calcium component is assumed to have a lower amplitude, then $f_s \leq T_s$, for a positive threshold $T_s$. In one embodiment, $T_s$ is about 0.05 times the density of water.

Finally, the term $E_c(f_c)$ represents the behavior of calcified regions in cardiac CT. With the assumption that calcium should be spatially localized, then the calcium distribution may be represented as:

$$E_c(f_c) = \|Df_c\|_p^p$$

where D is a discrete approximation to a derivative operator and $0 < p \leq 2$. Penalty, p, has localization and super-resolution ability when $p \approx 1$. In addition, under the assumption that the calcium component will generally be denser than non-calcific tissue, then $T_c \leq f_c$ for a positive threshold $T_c$. In one embodiment, $T_c$ is about 1.2 times the density of water.

In summary, a formulation for enhanced cardiac CT imaging is:

$$\hat{f} = \hat{f}_s + \hat{f}_c$$
$$= \arg\min_{f_s \leq T_s, f_c \geq T_c} \|g - H(f_s + f_c)\|_2^2 + \alpha_s \|Df_s\|_2^2 + \alpha_c \|Df_c\|_1^1$$

The formulation explicitly represents a single unified approach to calcium deblurring. The formulation may be readily extended to capture other effects, including Poisson observation models, additional field constraints, components for additional biological structures, etc.

Figure 4:
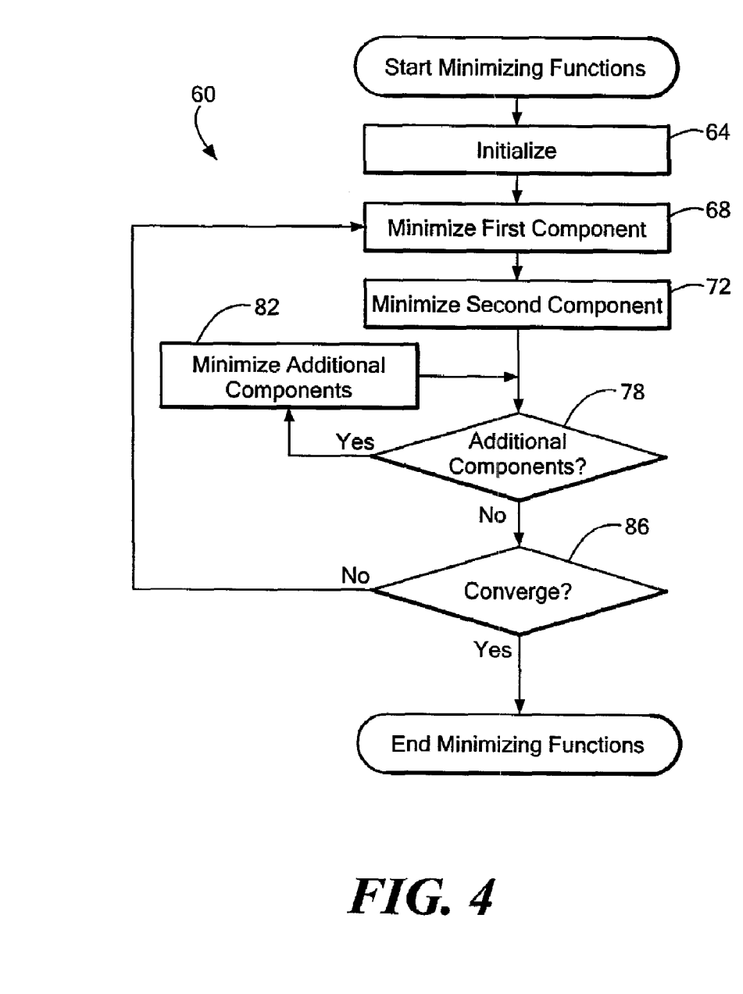
FIG. 4 is a flowchart for a process of minimizing total energy functional across all image components.

Referring to FIGS. 3 and 4, process 50 minimizes the functions for the components using, for example, a process 60. In particular, the energy function are minimized with respect to the values of the components $f_s$ and $f_c$ across an image to obtain a reconstructed image with enhanced behavior (i.e., better image) than a standard filtered back projection image. Minimization for the optimal enhanced image may be conducted through a series of iterative steps, for example, using a block coordinate descent approach and defining an outer iteration, which alternatively minimizes with respect to the tissue components $f_s$ and $f_c$ while the other component is held fixed.

Referring now to FIG. 4, process 60 begins with an initialization as shown in processing block 64. For example, initializing $f_s^{(k)}$ where k=0. Process 60 minimizes the first component (68). For example, minimizing the calcium component:

$$\hat{f}_c^{(k+1)} = \arg\min_{f_c \geq T_c} \|g - H(f_s^{(k)} + f_c)\|_2^2 + \alpha_c \|Df_c\|_1^1$$

Process 60 minimizes the second component (72). For example, minimizing the non-calcified component:

$$\hat{f}_s^{(k+1)} = \arg\min_{f_s \leq T_s} \|g - H(f_c^{(k+1)} + f_s)\|_2^2 + \alpha_s \|Df_s\|_2^2$$

Each subminimization is solved using an algebraic reconstruction technique (ART)-like iteration. Such ART-like techniques are well-known to persons of ordinary skill in the art. Process 60 determines if there are additional components (78). If so, process 60 minimized the additional components (82). Process 60 determines if there is convergence (86).

In some embodiments, process 60 may be initialized with, for example, a filtered back projection based reconstruction to provide an initial estimate of $\hat{f}_s^{(0)}$.

The processes described herein may also be applied to low-dose imaging applications. While conventional medical imaging systems such as CTs utilize specific dosages so as to obtain images of sufficient quality (i.e., sufficient signal-to-noise ratios), the processes described herein may be used in poorer signal-to-noise environments by virtue of the constraints imposed on each term. That is, constraints imposing a smoothing process may be applied to enhance the appearance of poor signal-to-noise images and minimize the impact of poor image quality. Such a system will permit patients to be scanned while reducing exposure to unwanted radiation. For example, in cardiac CT, routine dosage values are 100-140 KeVs, but the processes described herein may be used for imaging processing using low-dose data (e.g., approximately 10-50% (or lower) of CT dosage values)).

In one example of a smoothing process, given a recorded low-dose noisy image, g', a smooth version of g',f', may be generated using a number of different techniques. One approach is to minimize a global smoothing equation:

$$\min_{f'}(\alpha \|g' - f'\|^2 + \beta \|\nabla f'\|^2)$$

where $\nabla$ denotes the gradient smoothing operator, and $\alpha$ and $\beta$ determine the relative weighting of the fidelity of f' to the observed noisy image g' and the smoothness constraint is $\nabla f'$. In one embodiment, f' may be an estimate for any ideal image, f (e.g., a CT image). In another embodiment, f' may be one or more of the components of the ideal image, f, such as $f_s$ and $f_c$ described previously. The global smoothing equation may be minimized using a number of standard techniques, for example, using gradient descent on corresponding Euler equations.

The global smoothing equation may be further refined to include a presence of edges (i.e., the transitions from one material to another material) by using a piece-wise smoothing equation:

$$\min_{f'}\left(\alpha \|g' - f'\|^2 + \beta \|\nabla f'\|^2 (1-\upsilon)^2 + \frac{\rho}{2}\|\nabla \upsilon\| + \frac{\upsilon^2}{2\rho}\right)$$

where gradient-based smoothing is suppressed when edges are present. That is, $\upsilon$ represents an edge probability field where $\upsilon \approx 1$ denotes high likelihood of the presence of an edge, and $\upsilon \approx 0$ indicates absence of an edge. $\rho$ represents a region of support for estimating the edge function $\upsilon$. For example, if $\rho$ is small, then the region of support is small indicating thin edges. If the $\rho$ is large, then the region of support is large indicating potentially thick edges. In the global smoothing equation, smoothing is performed everywhere in the noisy image while in the piece-wise smooth equation, smoothing is performed where there are no edges. Hence, the edges form regions (pieces of the noisy image) within which smoothing is performed. Variations of piece-wise smoothing are well-known in the literature, for example, using Mumford-Shah equations.

Figure 5:
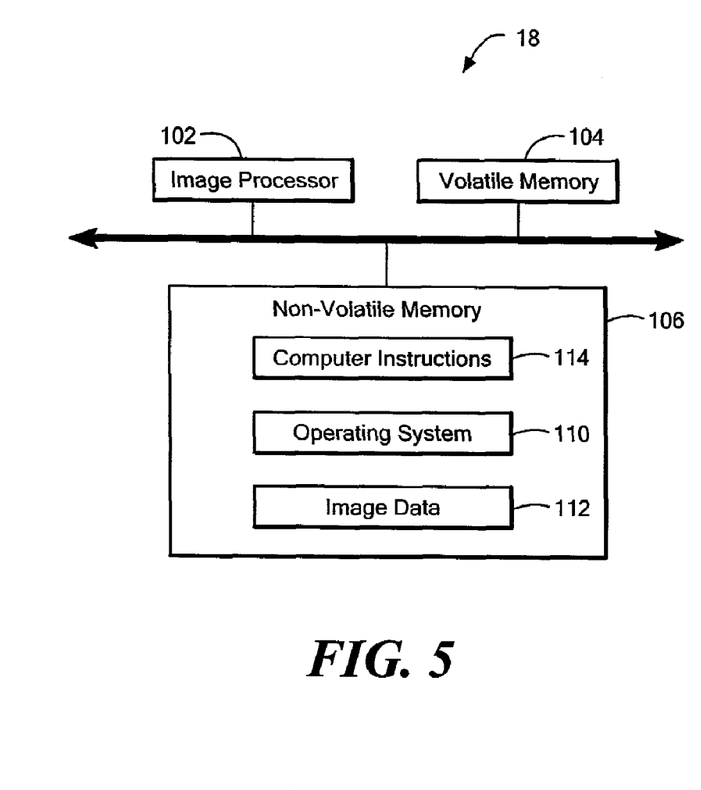
FIG. 5 is a diagrammatic view of a computer system on which the processes of FIG. 3 and FIG. 4 may be implemented.

FIG. 5 shows a computer 18 using process 50 including process 60. Computer 100 includes an image processor 102, a volatile memory 104, and a non-volatile memory 106 (e.g., hard disk). Non-volatile memory 106 stores operating system 110; image data 112; and computer instructions 114, which are executed by the image processor 102 out of volatile memory 104 to perform all or part of process 50 and process 60.

Processes 50 and 60 are not limited to use with the hardware and software of FIG. 5; it may find applicability in any computing or processing environment and with any type of machine that is capable of running a computer program. Processes 50 and 60 may be implemented in hardware, software, or a combination of the two. Processes 50 and 60 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processes 50 and 60 and to generate output information.

The system can be implemented, at least in part, via a computer program product (i.e., a computer program tangibly embodied in an information carrier (e.g., in a machine-readable storage device or in a propagated signal) for execution by, or to control the operation of, data processing apparatus (e.g., a programmable processor, a computer, or multiple computers)). Each such program may be implemented in a high level procedural or object-oriented programming language to communicate with a computer system. However, the programs can be implemented in assembly or machine language. The language may be a compiled or an interpreted language and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processes 50 and 60. Processes 50 and 60 may also be implemented as a machine-readable storage medium, configured with a computer program, where upon execution, instructions in the computer program cause the computer to operate in accordance with processes 50 and 60.

The processes described herein are not limited to the specific embodiments described herein. For example, the processes are not limited to the specific processing order of FIGS. 3 and 4. Rather, any of the blocks of FIGS. 3 and 4 may be re-ordered, combined, repeated or removed, as necessary, to achieve the results set forth above.

The system described herein is not limited to use with the hardware and software described above. The system can be implemented in digital electronic circuitry, or in computer hardware, firmware, software, or in combinations thereof.

Method steps associated with implementing the system can be performed by one or more programmable processors executing one or more computer programs to perform the functions of the system. All or part of the system can be implemented as, special purpose logic circuitry (e.g., an FPGA (field programmable gate array) and/or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data.

Elements of different embodiments described herein may be combined to form other embodiments not specifically set forth above. Other embodiments not specifically described herein are also within the scope of the following claims.

What is claimed is:

1. An apparatus comprising:
a memory that stores executable instructions to reduce a blooming effect of a bright object in a medical image generated from a low-dose imaging system; and
a processor that executes the instructions to:
characterize an ideal image as a composition of a first component and a second component, the first component being characterized by a first function and the second component being characterized by a second function;
minimize the first function and the second function using a smoothing process; and
generate the medical image based on the instructions to minimize;
wherein the instructions to minimize the first function and the second function using the smoothing process comprises instructions to implement a smoothing process in accordance with an equation:

$$\min_{f'}(\alpha\|g' - f'\|^2 + \beta\|\nabla f'\|^2),$$

where f' represents at least a portion of the ideal image, g' represents an image from the low-dose imaging system and α and β determine a relative weighting of the fidelity of f' to the image, g'.

2. The apparatus of claim 1 wherein f' represents an image of the first component.

3. The apparatus of claim 1 wherein f' represents an image of the second component.

4. The apparatus of claim 1 wherein f' represents the ideal image.

5. An apparatus comprising:
a memory that stores executable instructions to reduce a blooming effect of a bright object in a medical image generated from a low-dose imaging system; and
a processor that executes the instructions to:
characterize an ideal image as a composition of a first component and a second component, the first component being characterized by a first function and the second component being characterized by a second function;
minimize the first function and the second function using a smoothing process; and
generate the medical image based on the instructions to minimize;
wherein the instructions to minimize the first function and the second function using the smoothing process comprises instructions to implement a smoothing process in accordance with an equation:

$$\min_{f'}\left(\alpha\|g' - f'\|^2 + \beta\|\nabla f'\|^2(1-v)^2 + \frac{\rho}{2}\|\nabla v\| + \frac{v^2}{2\rho}\right),$$

where f' represents at least a portion of the ideal image, g' represents an image from the low-dose imaging system and α and β determine a relative weighting of the fidelity of f' to the image, g', u represents a probability of a presence of an edge and ρ represents a thickness of the edge.

6. An article comprising a machine-readable medium that stores executable instructions to reduce a blooming effect of a bright object in a medical image generated from a low-dose imaging system, the instructions causing a machine to:
characterize an ideal image as a composition of a first component and a second component, the first component being characterized by a first function and the second component being characterized by a second function;
minimize the first function and the second function using a smoothing process; and
generate the medical image based on the instructions causing a machine to minimize;
wherein the instructions causing the machine to minimize the first function and the second function using the smoothing process comprises instructions causing the machine to use an equation:

$$\min_{f'}\left(\alpha\|g' - f'\|^2 + \beta\|\nabla f'\|^2(1-v)^2 + \frac{\rho}{2}\|\nabla v\| + \frac{v^2}{2\rho}\right),$$

where f' represents at least a portion of the ideal image, g' represents an image from the low-dose imaging system and α and β determine a relative weighting of the fidelity of f' to the image, g', u represents a probability of a presence of an edge and ρ represents a thickness of the edge.

7. The article of claim 6, wherein f' is from a group of images consisting of an image of the first component, an image of the second component and the ideal image.

8. An article comprising a machine-readable medium that stores executable instructions to reduce a blooming effect of a bright object in a medical image generated from a low-dose imaging system, the instructions causing a machine to:
characterize an ideal image as a composition of a first component and a second component, the first component being characterized by a first function and the second component being characterized by a second function;
minimize the first function and the second function using a smoothing process; and generate the medical image based on the instructions causing a machine to minimize;
wherein the instructions causing the machine to minimize the first function and the second function using the smoothing process comprises instructions causing the machine to use an equation:

$$\min_{f'}(\alpha\|g' - f'\|^2 + \beta\|\nabla f'\|^2),$$

where f' represents at least a portion of the ideal image, g' represents an image from the low-dose imaging system and α and β determine a relative weighting of the fidelity of f' to the image, g'.

9. The article of claim 8, wherein f' is from a group of images consisting of an image of the first component, an image of the second component and the ideal image 10. A method for producing a CT image comprising:
 a) acquiring CT data of a region-of-interest (ROI) in a subject;
 b) reconstructing the CT data into a set of component images, each having a known characteristic, by iteratively minimizing a model that relates the acquired CT data to estimates of each of the component images and includes constraints related to each of the known characteristics;
 c) performing a selected noise suppression operation on each of the component images to produce a corresponding set of smooth component images; and
 d) combining the smooth component images to produce a smooth CT image of the subject.

11. The method as recited in claim 10 wherein the model employs the relationship:

$$\hat{f} = \hat{f}_s + \hat{f}_c$$
$$= \arg\min_{f_s \le T_s, f_c \ge T_c} \|g - H(f_s + f_c)\|_2^2 + \alpha_s\|Df_s\|_2^2 + \alpha_c\|Df_c\|_1^1$$

in which f̂ denotes the medical image, f̂$_s$ and f̂$_c$ respectively denote estimates of a first component image and a second component image, g denotes the acquired CT data, H denotes a system response of a CT system, f$_s$ and f$_c$ denote underlying ideal first and second component images, respectively, D denotes a derivative operator, α$_s$ and α$_c$ denote weighting terms, and T$_s$ and T$_c$ denote constraints for the first and second components, respectively.

12. The method as recited in claim 10 wherein:
 step b) further comprises reconstructing the CT data into a first component image having a high intensity characteristic and a second CT component image having a low intensity characteristic;
 step c) further comprises producing a first smooth component image by performing a first noise suppression operation on the first component image and a second smooth component image by performing a second noise suppression operation on the second component image; and
 step d) includes combining the first and second smooth component images to produce the smooth CT image of the subject.

13. The method as recited in claim 10 wherein step a) includes acquiring CT data of a ROI in the subject using a low radiation dose acquisition so that the noise in the CT data is associated with the low radiation dose.

14. The method as recited in claim 10 wherein the selected noise suppression operation includes employing a gradient smoothing operator.

15. The method as recited in claim 14 wherein performing a selected noise suppression operation on a component image to produce a smooth component image includes employing the relationship:

$$\min_{f'}(\alpha\|g' - f'\|^2 + \beta\|\nabla f'\|^2),$$

in which g' denotes the component image, f' denotes an estimate of the smooth component image, α a and β denote weighting factors, ∇ and V denotes the gradient smoothing operator, 16. The method as recited in claim 15 wherein the weighting factors weight a relative fidelity of the smooth component image to the component the image.

17. The method as recited in claim 15 wherein suppressing the gradient smoothing operator in component image areas containing edges includes employing the relationship:

$$\min_{f'}\left(\alpha\|g' - f'\|^2 + \beta\|\nabla f'\|^2(1-v)^2 + \frac{\rho}{2}\|\nabla v\| + \frac{v^2}{2\rho}\right)$$

in which g' denotes the component image f' denotes an estimate of the smooth component image α and β denote weigting factors, ∇ denotes the gradient smoothing operator, v denotes an adge probability field, and ρ denotes a rehion of support for the edge probability field.

18. The method as recited in claim 14 wherein the gradient smoothing operator is suppressed in component image containing edges.

* * * * *